(12) United States Patent
Xiang

(10) Patent No.: US 9,099,873 B2
(45) Date of Patent: Aug. 4, 2015

(54) OVER-CURRENT AND OVER-VOLTAGE PROTECTION CIRCUIT AND METHOD FOR AN ELECTRONIC CIGARETTE

(71) Applicant: Zhiyong Xiang, Guangdong (CN)

(72) Inventor: Zhiyong Xiang, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 0 days.

(21) Appl. No.: 14/100,873

(22) Filed: Dec. 9, 2013

(65) Prior Publication Data

US 2015/0036250 A1 Feb. 5, 2015

(51) Int. Cl.
*H02H 3/00* (2006.01)
*H02J 7/00* (2006.01)

(52) U.S. Cl.
CPC ............. *H02J 7/0029* (2013.01); *H02J 7/0026* (2013.01); *Y02T 10/7005* (2013.01)

(58) Field of Classification Search
USPC .......................................... 361/87, 91.1, 93.9
See application file for complete search history.

(56) References Cited

U.S. PATENT DOCUMENTS

2006/0222930 A1* 10/2006 Aradachi et al. ................. 429/96
2013/0154549 A1* 6/2013 Hanawa et al. ................ 320/107

* cited by examiner

*Primary Examiner* — Danny Nguyen
(74) *Attorney, Agent, or Firm* — Locke Lord LLP; Tim Tingkang Xia, Esq.

(57) ABSTRACT

An over-current and over-voltage protection circuit for an electronic cigarette, comprising a battery and an interface, a control unit and a charging detection switch unit; the control unit is configured for calculating an actual charging current according to the first working voltage and determining whether the actual charging current exceeds a preset charging current threshold value, and sending a first charging controlling signal to the charging detection switch unit; the control unit is further configured for real-timely detecting an input voltage of the interface, determining whether the input voltage of the interface is in over-voltage status, and controlling a turned-on or turned-off operation of the charging detection switch unit. The over-current over-voltage protection circuit and method eliminate the security risk of the battery pole not having a charging management circuit in the non-normal charging status.

12 Claims, 2 Drawing Sheets

OVER-CURRENT AND OVER-VOLTAGE PROTECTION CIRCUIT AND METHOD FOR AN ELECTRONIC CIGARETTE

CROSS-REFERENCE TO RELATED APPLICATIONS

This non-provisional application claims priority under 35 U.S.C. §119(a) on Patent Application No. 201310330134.5, filed in P.R. China on Jul. 31, 2013, the entire contents of which are hereby incorporated by reference.

FIELD OF THE INVENTION

The present application relates to the field of electronic cigarettes, and more particularly relates to an over-current and over-voltage protection circuit and method adapted for a charging process and a discharging process of the electronic cigarette.

BACKGROUND OF THE INVENTION

At present, chargeable battery poles of electronic cigarettes not having a charging management circuit in the prior art (e.g., electronic cigarettes controlled by some microcontrollers) don't have an over-voltage charging protection function and an over-current charging protection function in a charging process. These chargeable battery poles of electronic cigarettes entirely rely on a battery charging management chip in an external charger to prevent over-voltage and over-current conditions in the charging process.

The protection method relying on an external product has defects as follows.

Defect 1: external chargers in the prior art have different charging current magnitudes; and when a low-capacity battery is charged by a high current, the longevity and performance of the battery will be affected adversely.

Defect 2: if the external charger lose efficacy, or don't have a current-limiting function or voltage-limiting function, the battery in the battery pole will be affected adversely, and will leak, burn and even explode seriously.

Defect 3: if a user uses a wrong charger, and uses the charger not having a charging management function to charge a battery pole, a burning and an exploded accident of the battery will be caused.

Therefore, there is a big security risk of the battery pole of the electronic cigarette not having a charging management function in a non-normal charging status, and the battery pole of the electronic cigarette needs to be improved.

SUMMARY OF THE INVENTION

The present application is to provide an over-current and over-voltage protection circuit and method for an electronic cigarette, aiming at the defect that there is a big security risk of the battery pole of the electronic cigarette not having a charging management function in a non-normal charging status.

The technical solutions of the present application for solving the technical problems are as follows:

In one aspect, an over-current and over-voltage protection circuit for an electronic cigarette comprises a battery and at least an interface; the over-current and over-voltage protection circuit further comprises a control unit and a charging detection switch unit;

the control unit is electrically connected to the battery, the interface and the charging detection switch unit respectively; the charging detection switch unit is electrically connected to an end of the battery, and the interface is electrically connected to the charging detection switch unit and the battery respectively;

the charging detection switch unit is configured for real-timely detecting a first working voltage generated by an actual current flowing through an internal resistor of the charging detection switch unit, and sending the first working voltage to the control unit;

the control unit is configured for calculating an actual charging current according to the first working voltage and determining whether the actual charging current exceeds a preset charging current threshold value, and sending a first charging controlling signal to the charging detection switch unit;

the control unit is further configured for real-timely detecting an input voltage of the interface, determining whether the input voltage of the interface is in an over-voltage status, and sending a second charging controlling signal to the charging detection switch unit; the first charging controlling signal or the second charging controlling signal is configured for controlling a turned-on or turned-off operation of the charging detection switch unit.

In one embodiment, the over-current and over-voltage protection circuit further comprises a discharging detection switch unit;

the discharging detection switch unit is electrically connected to the charging detection switch unit and the interface respectively;

the discharging detection switch unit is configured for real-timely detecting a second working voltage generated by an actual current flowing through an internal resistor of the discharging detection switch unit, and sending the second working voltage to the control unit;

the control unit is further configured for calculating an actual discharging current according to the second working voltage, determining whether the actual discharging current exceeds a preset discharging current threshold value, and sending a discharging controlling signal to the discharging detection switch unit; and the discharging controlling signal is configured for controlling a turned-on or turned-off operation of the discharging detection switch unit.

In the embodiment, the control unit includes a microprocessor, and the model of the microprocessor is SN8P2711B.

In the embodiment, the charging detection switch unit includes a first MOSFET;

the interface has a positive terminal and a negative terminal, and the positive terminal is electrically connected to an anode of the battery;

the drain of the first MOSFET is electrically connected to a cathode of the battery and a seventh pin of the microprocessor; the grid of the first MOSFET is electrically connected to the eighth pin of the microprocessor; the source of the first MOSFET is grounded.

a dropout voltage between the drain of the first MOSFET and the source of the first MOSFET is the first working voltage;

when the electronic cigarette is charged, the seventh pin of the microprocessor receives the first working voltage, and the microprocessor calculates the actual charging current according to the first working voltage; if the actual charging current exceeds the preset charging current threshold value, the eighth pin of the microprocessor sends the first charging controlling signal performing as a low level to the grid of the first MOSFET, and drives the first MOSFET to be turned off.

In the embodiment, the charging detection switch unit further includes a first resistor, and the first resistor is electrically connected between the grid of the first MOSFET and the anode of the battery;

the first resistor is configured for supplying a bias voltage for the first MOSFET in a normal status.

In another embodiment, the discharging detection switch unit includes a second MOSFET;

the source of the second MOSFET is grounded; the grid of the second MOSFET is electrically connected to a fifth pin of the microprocessor; the drain of the second MOSFET is electrically connected to a ninth pin of the microprocessor and the negative terminal of the interface;

a dropout voltage between the drain of the second MOSFET and the source of the second MOSFET is the second working voltage;

when the electronic cigarette is charged, the first working voltage is plus, and the second working voltage is minus; and the microprocessor determines that the battery is in a charging status;

When the electronic cigarette is discharged, the first working voltage is minus, and the second working voltage is plus; the microprocessor determines that the battery is in a discharging status, and calculates the actual discharging current according to the second working voltage; if the actual discharging current exceeds the preset discharging current threshold value, the fifth pin of the microprocessor sends a discharging controlling signal performing as a low level to the grid of the second MOSFET, and drives the second MOSFET to be turned off.

In the embodiment, the discharging detection switch unit further includes a second resistor, and the second resistor is electrically connected between the grid of the second MOSFET and the source of the second MOSFET;

the second resistor is configured for supplying a bias voltage for the second MOSFET in a normal status.

In the aspect, the over-current and over-voltage protection circuit further comprises a Schottky diode and a filter capacitor;

an anode of the Schottky diode is electrically connected to the positive terminal of the interface, and a cathode of the Schottky diode is electrically connected to a first pin of the microprocessor; one end of the filter capacitor is electrically connected to the first pin of the microprocessor, and the other end of the filter capacitor is grounded;

the first pin of the microprocessor is configured for real-timely detecting the input voltage of the interface, and the Schottky diode is configured for supplying a stable supply voltage for the microprocessor in a normal operational status.

In the aspect, the over-current and over-voltage protection circuit further comprises a warning circuit;

the warning circuit configured for giving out a warning when the battery is in an over-current or over-voltage status is electrically connected between the battery and the control unit.

In the aspect, the warning circuit includes an LED, a cathode of the LED is electrically connected to a fourth pin of the microprocessor through a resistor, and an anode of the LED is electrically connected to the anode of the battery.

In another aspect, an over-current and over-voltage protection method for an electronic cigarette is provided; and the over-current and over-voltage protection method comprises:

step 1: detecting a first working voltage generated by an actual charging current flowing through an internal resistor of a charging detection switch unit real-timely by the charging detection switch unit;

step 2: calculating the actual charging current according to the first working voltage, determining whether the actual charging current exceeds a preset charging current threshold value, and sending a first charging controlling signal to the charging detection switch unit by a control unit; meanwhile, detecting an input voltage of the interface real-timely, determining whether the input voltage of the interface is in over-voltage status, and sending a second charging controlling signal to the charging detection switch unit by the control unit; and step 3: controlling a turned-on or turned-off operation of the charging detection switch unit by the first charging controlling signal or the second charging controlling signal.

In one embodiment, the step 1 further includes:

detecting a second working voltage generated by an actual discharging current flowing through an internal resistor of a discharging detection switch unit real-timely by the discharging detection switch unit;

and the step 1 further includes determining processes as follows:

if the first working voltage is plus, and the second working voltage is minus, determining that a battery is in charging status, and continuing the step 2; if the first working voltage is minus, and the second working voltage is plus, receiving the second working voltage by the control unit, determining that the battery is in discharging status by the control unit, and entering step 2';

step 2': calculating the actual discharging current according to the second working voltage, determining whether the actual discharging current exceeds a preset discharging current threshold value, and sending a discharging controlling signal to the discharging detection switch unit by the control unit;

step 3': controlling a turned-on or turned-off operation of the discharging detection switch unit by the discharging controlling signal.

When implementing the over-current and over-voltage protection circuit and method for the electronic cigarette of the present application, the following advantageous effects can be achieved: the charging detection switch unit can not only detect the actual charging current in the charging status real-timely, and send the actual charging current to the control unit, but also turn off the connection between the battery and the external circuit under the control of the control unit when the control unit determines that the actual charging current is in the over-current status, so that the over-current protection can be achieved in the charging status, and the control unit can detect the input voltage of the interface directly, and turn off the charging detection switch unit when the input voltage is in the over-voltage status. The present application further provides the discharging detection switch unit, and the discharging detection switch unit can achieve the over-current protection in the discharging process. Therefore, the over-current and over-voltage protection circuit and method of the present application eliminate the security risk of the battery pole not having a charging management circuit in the non-normal charging status. A current sampling process of the present application doesn't need an external sampling resistor, and a characteristic that a conducting internal resistance of the MOSFET is small is directly utilized; and the dropout voltage between the drain and the source of the MOSFET is sent to the microprocessor of the control unit, and the microprocessor obtains the current flowing through the over-current and over-voltage protection circuit basing on the dropout voltage between the drain and the source of the MOSFET and the conducting internal resistance of the MOSFET; and the microprocessor determines whether the electrical connection between the battery, and the charger or the atomizer should be driven to be turned off according to the comparing result between the current flowing through the over-current and over-voltage protection circuit and the corresponding preset current threshold value. It need be noticed that a current direction in the charging status is opposite to the current direction in a discharging status, so that the microprocessor can only detect a plus dropout voltage of the charging detection switch unit in the charging process status, and can only detect a plus dropout voltage of the discharging detection switch unit in the discharging process status. Thus, the automatic determination of the charging and discharging processes is achieved, and the whole circuit structure is simpler.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENT

To make the technical feature, objective and effect of the present application be understood more clearly, now the specific implementation of the present application is described in detail with reference to the accompanying drawings and embodiments.

To overcome the defect that there is a security risk of a battery pole not having a charging management circuit in a non-normal charging status in the prior art, the present provides an over-current over-voltage protection circuit for an electronic cigarette, aiming at a battery pole not having a charging management circuit. This over-current and over-voltage protection circuit can avoid that the charging voltage and the charging current are exaggerated, when the battery pole is in a charging status. Moreover, the over-current and over-voltage protection circuit can prevent the discharging current of the battery pole from exaggerated, when the battery pole is in a discharging status.

Figure 1:
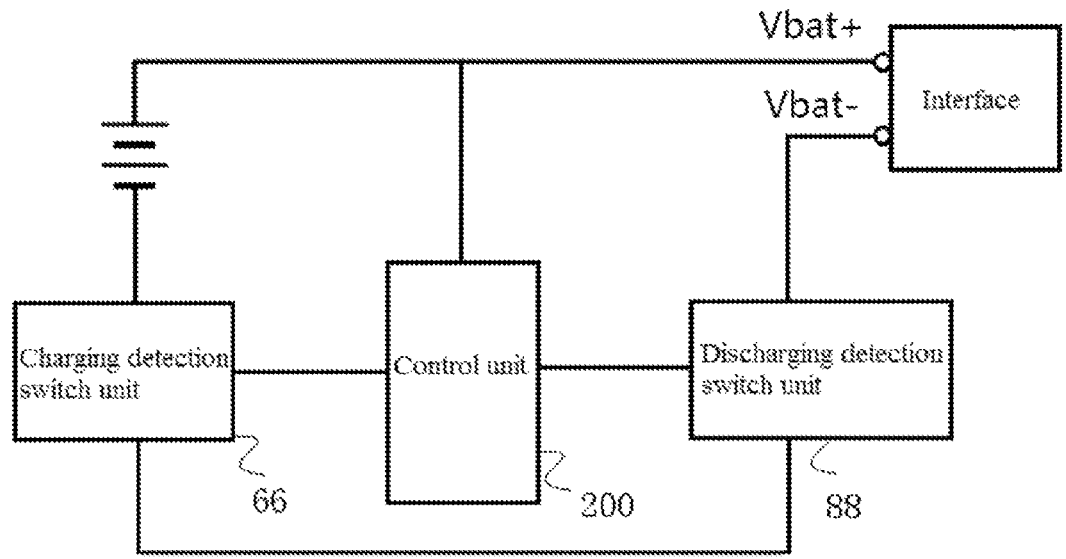
FIG. 1 is a structural schematic view of an over-current and over-voltage protection circuit for an electronic cigarette of the present application.

As shown in FIG. 1, FIG. 1 is a structural schematic view of the over-current and over-voltage protection circuit for the electronic cigarette of the present application.

The electronic cigarette includes a battery and at least an interface, the over-current and over-voltage protection circuit comprises a control unit 200 and a charging detection switch unit 66.

The control unit 200 is electrically connected to the battery, the interface and the charging detection switch unit 66 respectively; and the charging detection switch unit 66 is electrically connected to an end of the battery, the interface is electrically connected to the charging detection switch unit 66 and the battery respectively. In this embodiment, there is no a discharging detection switch unit 88 in FIG. 1.

The battery is configured for discharging when the interface is electrically connected to an atomizer, to provide a supply voltage for all the elements in the over-current and over-voltage protection circuit. Moreover, the battery is also configured for charging when the interface is electrically connected to an external charger. At the moment, an external power source provides a supply voltage for other elements in the over-current and over-voltage protection circuit.

The charging detection switch unit 66 is configured for detecting a first working voltage generated by an actual current flowing through an internal resistor of the charging detection switch unit 66 real-timely, and sends the first working voltage to the control unit 200.

The control unit 200 is configured for calculating an actual charging current according to the first working voltage, determining whether the actual charging current exceeds a preset charging current threshold value, and sending the first charging controlling signal to the charging detection switch unit 66.

The control unit 200 is further configured for detecting an input voltage of the interface real-timely, determining whether the input voltage of the interface is in an over-voltage status, and sending a second charging controlling signal to the charging detection switch unit 66; the first charging controlling signal or the second charging controlling signal drives the charging detection switch unit 66 to be turned off or turned on.

In other embodiment, the over-current over-voltage protection circuit further comprises the discharging detection switch unit 88 in FIG. 1.

The discharging detection switch unit 88 is electrically connected to the charging detection switch unit 66 and the interface respectively.

The discharging detection switch unit 88 is configured for detecting a second working voltage generated by an actual current flowing through an internal resistor of the discharging detection switch unit 88, and sending the second working voltage to the control unit 200.

the control unit 200 is further configured for calculating an actual discharging current according to the second working voltage, determining whether the actual discharging current exceeds a preset discharging current threshold value, and sending a discharging controlling signal to the discharging detection switch unit 88; and the discharging controlling signal controls a turned-on or turned-off operation of the discharging detection switch unit 88.

the over-current and over-voltage protection circuit further comprises a warning circuit. At the moment, the warning circuit is electrically connected between the battery and the control unit 200, and configured for giving out a warning when the battery is in the over-current or over-voltage status. The warning performs as a light-shining or a whistling.

Figure 2:
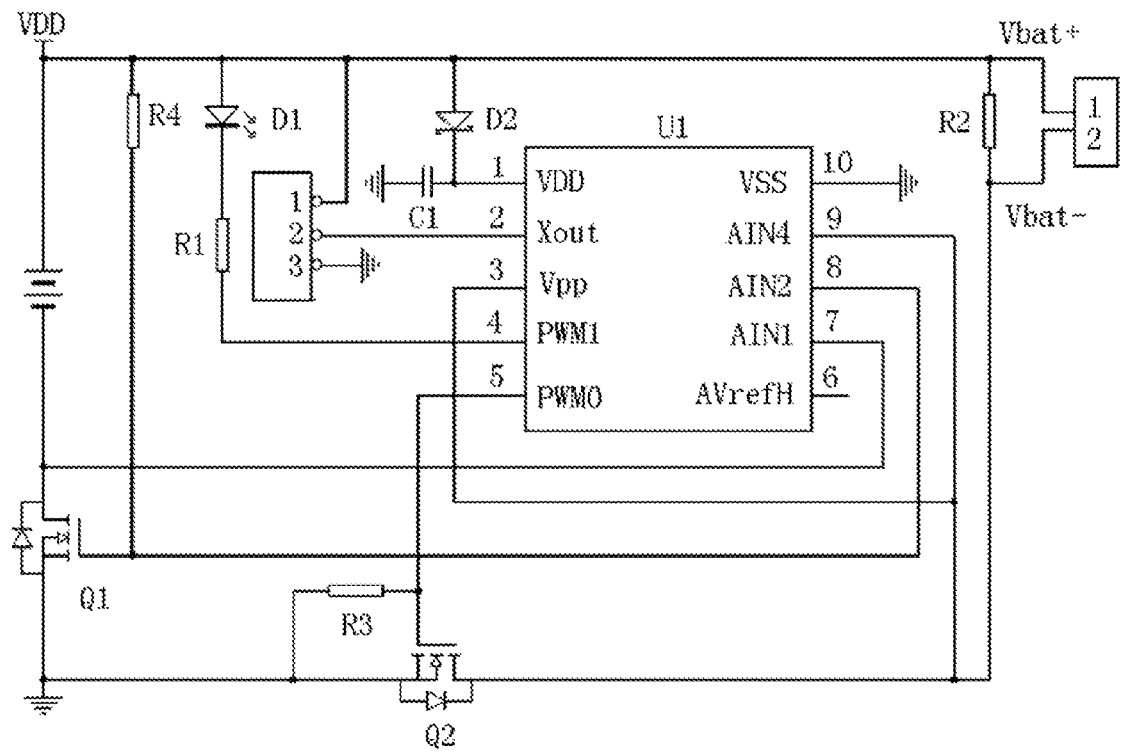
FIG. 2 is a circuit schematic view of an over-current and over-voltage protection circuit for an electronic cigarette of a first embodiment of the present application.

As shown in FIG. 2, FIG. 2 is a circuit schematic view of the over-current and over-voltage protection circuit for the electronic cigarette of a first embodiment of the present application.

The battery pole includes a battery and an interface; and the interface has a positive terminal Vbat+ and a negative terminal Vbat−, and a resistor R2 is electrically connected between the positive terminal Vbat+ and the negative terminal Vbat−, and the positive terminal Vbat+ is electrically connected to an anode of the battery directly; and a voltage sent from the anode of the battery serves as a supply voltage VDD of the whole over-current and over-voltage protection circuit.

The aforementioned control unit 200 includes a microprocessor U1, the model of the microprocessor U1 is SN8P2711B. A tenth pin of the microprocessor U1 serves as a grounded reference signal of the whole over-current and over-voltage protection circuit; a first pin of the microprocessor U1 is electrically connected to a cathode of a Schottky diode D2, and the first pin of the microprocessor U1 is further grounded through a filter capacitor C1. An anode of the Schottky diode D2 is electrically connected to the anode of the battery, and receives the supply voltage VDD; and a second pin of the microprocessor U1 is electrically connected to a smoking sensor, and the third pin of the microprocessor U1 is electrically connected to a ninth pin of the microprocessor U1.

The first pin of the microprocessor U1 detects the input voltage real-timely, the Schottky diode D2 is configured for providing a stable supply voltage for the microprocessor U1 in a normal working status.

A seventh pin of the microprocessor U1 is configured for detecting the charging current; the ninth pin of the microprocessor U1 is configured for detecting the discharging current; and an eighth pin of the microprocessor U1 is configured for giving out the first charging controlling signal or the second charging controlling signal; and a fifth pin of the microprocessor U1 is configured for outputting the discharging controlling signal.

The charging detection switch unit 66 includes a first MOSFET Q1; the discharging detection switch unit 88 includes a second MOSFET Q2; the first MOSFET Q1 is N-typed, and the mode of the first MOSFET Q1 is AO3400; and the second MOSFET Q2 is also N-typed, and the mode of the second MOSFET Q2 is AO3400. Of course, the MOSFET of the present application isn't limited at an N-typed MOSFET, and the MOSFET of the present application can be P-typed. When the P-typed MOSFET is used, the connection relationship can be correspondingly transformed according to this embodiment.

The drain of the first MOSFET Q1 is electrically connected to the cathode of the battery and the seventh pin of the microprocessor U1; The grid of the first MOSFET Q1 is electrically connected to the eighth pin of the microprocessor U1, and the grid of the first MOSFET Q1 is electrically connected to the anode of the battery through a resistor R4; and the source of the first MOSFET Q1 is electrically connected to the source of the second MOSFET Q2; the source of the second MOSFET Q2 is grounded; the source of the second MOSFET Q2 is electrically connected to the grid of the second MOSFET Q2 through a resistor R3, and the grid of the second MOSFET Q2 is electrically connected to the fifth pin of the microprocessor U1; the drain of the second MOSFET Q2 is electrically connected to the ninth pin of the microprocessor U1; and the drain of the second MOSFET Q2 is electrically connected to the negative terminal Vbat– of the interface.

The resistor R4 and the resistor R3 are configured for supplying bias voltages for the first MOSFET Q1 and the second MOSFET Q2. The resistor R4 is electrically connected to the anode of the battery to drive the first MOSFET Q1 to be an on-state. The resist R3 is grounded to drive the second MOSFET Q2 to be a turn-off state.

All the chips, pins of the chips and MOSFET modes involved in the present application are just a sample, and can be replaced by products having similar functions.

It is noticed that the current and the voltage are sampled without using a special voltage sampling resistor or a special current sampling resistor in the present embodiment.

the voltage in the charging process is directly sampled by the VDD pin of the microprocessor U1, i.e., the aforementioned first pin of the microprocessor U1.

The current in the charging or discharging process is sampled through a characteristic that the conducting internal resistor of the MOSFET is small and constant when the MOSFET bias voltage is unchanged, and the dropout voltage of the MOSFET can be sampled directly. It is noticed that because the over-current standards of the charging process and the discharging process are different, whether the battery is in the charging status or discharging status needs to be determined. In the present application, the source of the first MOSFET Q1 configured for controlling charging and the source of the second MOSFET Q2 configured for controlling discharging are grounded; the drain of the first MOSFET Q1 is electrically connected to the microprocessor U1, and the dropout voltage between the drain and the source of the first MOSFET Q1, i.e., the dropout voltage of the conducting internal resistor of the first MOSFET Q1 can be sampled. This dropout voltage of the conducting internal resistor of the first MOSFET Q1 is plus in the charging status, and minus in the discharging status. The microprocessor U1 can only receive the plus dropout voltage signal, and not receive the minus dropout voltage signal, which is convenient for determining which state the battery is in. According to the dropout voltage of the conducting internal resistor of the first MOSFET Q1 obtained and the conducting internal resistance of the first MOSFET Q1, the charging current flowing through the first MOSFET Q1 can be calculated. Similarly, as the drain of the second MOSFET Q2 configured for controlling charging is electrically connected to the microprocessor U1, the dropout voltage between the drain and the source of the second MOSFET Q2, i.e., the dropout voltage of the conducting internal resistor of the second MOSFET Q2 can be sampled; and the dropout voltage of the conducting internal resistor of the second MOSFET Q2 is minus in the charging status, and plus in the discharging status. According to the dropout voltage of the conducting internal resistor of the second MOSFET Q2 sampled and the conducting internal resistor of the second MOSFET Q2, the discharging current flowing through the second MOSFET Q2 can be calculated.

The dropout voltage between the aforementioned drain of the first MOSFET Q1 and the source of the first MOSFET Q1 is the first working voltage; and the dropout voltage between the drain of the second MOSFET Q2 and the source of the second MOSFET Q2 is the second working voltage.

When the electronic cigarette is charged, the first working voltage is plus, the seventh pin of the microprocessor U1 receives the first working voltage, and the second working voltage is minus, and the ninth pin of the microprocessor U1 cannot receive the second working voltage, the microprocessor U1 determines that the battery is in the charging status, and calculates the actual charging current according to the first working voltage. If the actual charging current exceeds the preset charging current threshold value, the eighth pin of the microprocessor U1 sends the first charging controlling signal performing as a low level to the grid of the first MOSFET Q1, and drives the first MOSFET Q1 to be turned off.

When the electronic cigarette is discharged, the first working voltage is minus, the seventh pin of the microprocessor U1 cannot receive the first working voltage; and the second working voltage is plus; the ninth pin of the microprocessor receives the second working voltage, the microprocessor U1 determines that the battery is in the discharging status, and calculates the actual discharging current according to the second working voltage; if the actual discharging current exceeds the preset discharging current threshold value, the fifth pin of the microprocessor sends a discharging controlling signal performing as a low level to the grid of the second MOSFET Q2, and drives the second MOSFET Q2 to be turned off.

In the present embodiment, as the charging current of the battery pole in the charging process is about 100 mA normally, the charging current threshold value is confirmed as 500 mA; and the discharging current is higher normally in the discharging process, and the discharging current can be 1-2 A in the discharging process; the discharging current threshold value is confirmed as 3-5 A. In the present application, the discharging current threshold value is 3 A advantageously.

In this embodiment, the over-current and over-voltage protection circuit further comprises a warning circuit; specifically the warning circuit includes an LED D1, the cathode of the LED D1 is electrically connected to the fourth pin of the microprocessor U1 through the resistor R1, and the anode of the LED D1 is electrically connected to the anode of the battery.

Figure 3:
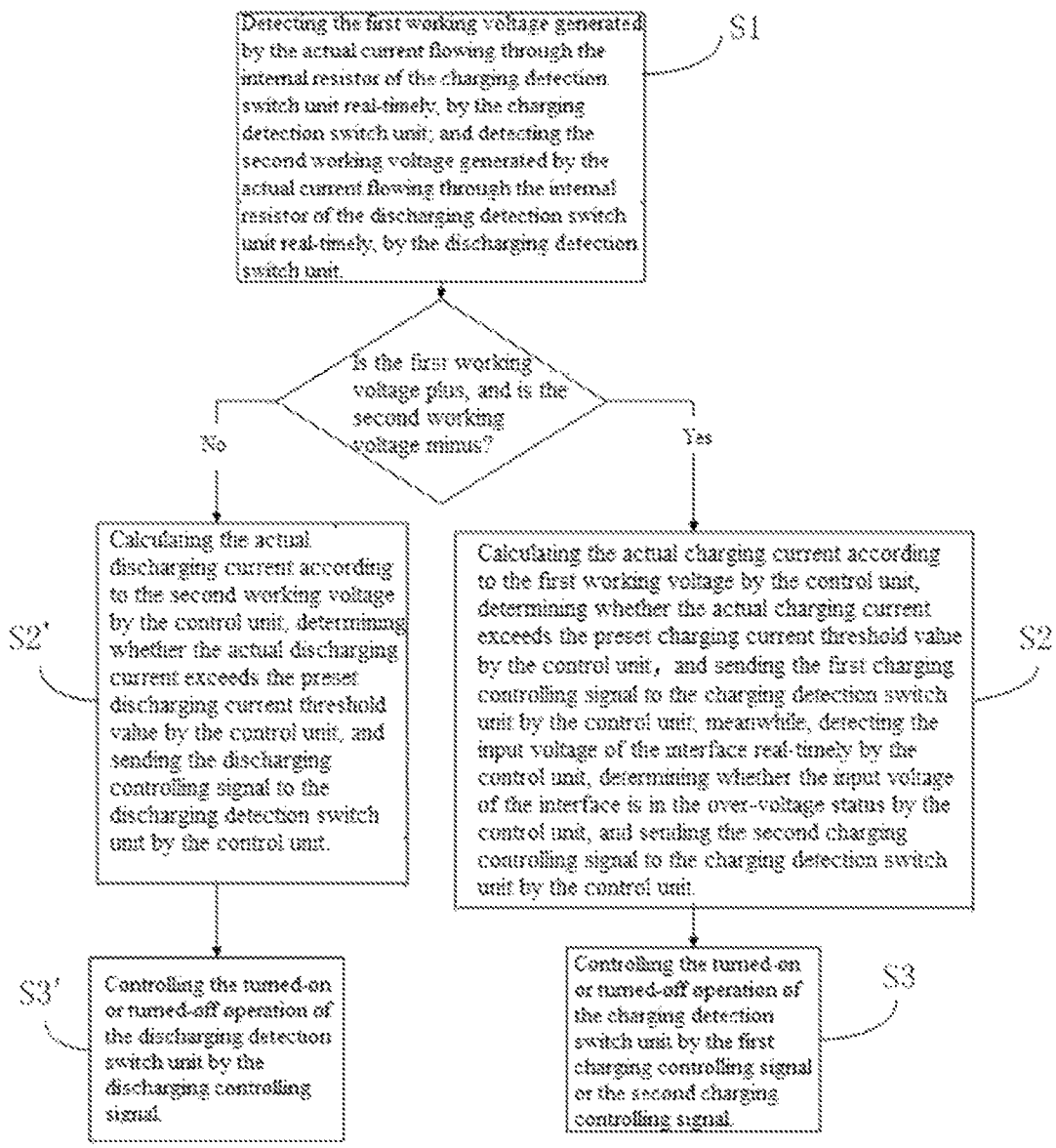
FIG. 3 is a flow chart of an over-current and over-voltage protection method for an electronic cigarette of the present application.

The present application further provides an over-current and over-voltage protection method for the electronic cigarette. As shown in FIG. 3, FIG. 3 is a flow chart of an over-current over-voltage protection method for the electronic cigarette of the present application.

Corresponding to the over-current and over-voltage protection circuit only having the charging detection switch unit, the over-current and over-voltage protection method includes steps as follows:

step 1: the charging detection switch unit 66 detects a first working voltage generated by an actual charging current flowing through an internal resistor of the charging detection switch unit 66 real-timely;

step 2: the control unit 200 calculates the actual charging current according to the first working voltage, determines whether the actual charging current exceeds a preset charging current threshold value, and sends a first charging controlling signal to the charging detection switch unit 66; meanwhile, the control unit 200 detects an input voltage of the interface real-timely, determines whether the input voltage of the interface is in over-voltage status, and sends a second charging controlling signal to the charging detection switch unit 66;

step 3: the first charging controlling signal or the second charging controlling signal controls a turned-on or turned-off operation of the charging detection switch unit 66.

Corresponding to the aforementioned over-current and over-voltage protection circuit including the charging detection switch unit and the discharging detection switch unit, the over-current and over-voltage protection method shows as follows:

the step 1 further includes:

the discharging detection switch unit 88 detects a second working voltage generated by an actual discharging current flowing through an internal resistor of the discharging detection switch unit 88 real-timely; and the step 1 further includes determining processes as follows:

if the first working voltage is plus, and the second working voltage is minus, the control unit 200 determines that a battery is in charging status, and step 2 is continued; if the first working voltage is minus, and the second working voltage is plus, the control unit 200 receives the second working voltage, and determines that the battery is in discharging status, and step 2' is entered;

step 2': the control unit 200 calculates the actual discharging current according to the second working voltage, determines whether the actual discharging current exceeds a preset discharging current threshold value, and sends a discharging controlling signal to the discharging detection switch unit 88;

step 3': the discharging controlling signal controls a turned-on or turned-off operation of the discharging detection switch unit 88.

While the embodiments of the present application are described with reference to the accompanying drawings above, the present application is not limited to the above-mentioned specific implementations. In fact, the above-mentioned specific implementations are intended to be exemplary not to be limiting. In the inspiration of the present application, those ordinary skills in the art can also make many modifications without breaking away from the subject of the present application and the protection scope of the claims. All these modifications belong to the protection of the present application.

The invention claimed is:

1. An over-current and over-voltage protection circuit for an electronic cigarette, comprising a battery and at least an interface, wherein the over-current and over-voltage protection circuit further comprises a control unit and a charging detection switch unit;

the control unit is electrically connected to the battery, the interface and the charging detection switch unit respectively; the charging detection switch unit is electrically connected to an end of the battery, and the interface is electrically connected to the charging detection switch unit and the battery respectively;

the charging detection switch unit is configured for real-timely detecting a first working voltage generated by an actual charging current flowing through an internal resistor of the charging detection switch unit, and sending the first working voltage to the control unit;

the control unit is configured for calculating the actual charging current according to the first working voltage and determining whether the actual charging current exceeds a preset charging current threshold value, and sending a first charging controlling signal to the charging detection switch unit;

the control unit is further configured for real-timely detecting an input voltage of the interface, determining whether the input voltage of the interface is in over-voltage status, and sending a second charging controlling signal to the charging detection switch unit; the first charging controlling signal or the second charging controlling signal is configured for controlling a turned-on or turned-off operation of the charging detection switch unit.

2. The over-current and over-voltage protection circuit for the electronic cigarette according to claim 1, wherein the over-current and over-voltage protection circuit further comprises a discharging detection switch unit;

the discharging detection switch unit is electrically connected to the charging detection switch unit and the interface respectively;

the discharging detection switch unit is configured for real-timely detecting a second working voltage generated by an actual discharging current flowing through an internal resistor of the discharging detection switch unit, and sending the second working voltage to the control unit;

the control unit is further configured for calculating the actual discharging current according to the second working voltage, determining whether the actual discharging current exceeds a preset discharging current threshold value, and sending a discharging controlling signal to the discharging detection switch unit; and the discharging controlling signal is configured for controlling a turned-on or turned-off operation of the discharging detection switch unit.

3. The over-current and over-voltage protection circuit for the electronic cigarette according to claim 2, wherein the control unit includes a microprocessor; and the model of the microprocessor is SN8P2711B.

4. The over-current and over-voltage protection circuit for the electronic cigarette according to claim 3, wherein the charging detection switch unit includes a first MOSFET;

the interface has a positive terminal and a negative terminal, and the positive terminal is electrically connected to an anode of the battery;

the drain of the first MOSFET is electrically connected to a cathode of the battery and a seventh pin of the microprocessor; the grid of the first MOSFET is electrically connected to the eighth pin of the microprocessor; the source of the first MOSFET is grounded;

a dropout voltage between the drain of the first MOSFET and the source of the first MOSFET is the first working voltage;

when the electronic cigarette is charged, the seventh pin of the microprocessor receives the first working voltage, and the microprocessor calculates the actual charging current according to the first working voltage; if the actual charging current exceeds the preset charging current threshold value, the eighth pin of the microprocessor sends the first charging controlling signal performing as a low level to the grid of the first MOSFET, and drives the first MOSFET to be turned off.

5. The over-current and over-voltage protection circuit for the electronic cigarette according to claim 4, wherein the charging detection switch unit further includes a first resistor, and the first resistor is electrically connected between the grid of the first MOSFET and the anode of the battery;

the first resistor is configured for supplying a bias voltage for the first MOSFET in a normal status.

6. The over-current and over-voltage protection circuit for the electronic cigarette according to claim 4, wherein the discharging detection switch unit includes a second MOSFET;

the source of the second MOSFET is grounded; the grid of the second MOSFET is electrically connected to a fifth pin of the microprocessor; the drain of the second MOSFET is electrically connected to a ninth pin of the microprocessor and the negative terminal of the interface;

a dropout voltage between the drain of the second MOSFET and the source of the second MOSFET is the second working voltage;

when the electronic cigarette is charged, the first working voltage is plus, and the second working voltage is minus; and the microprocessor determines that the battery is in a charging status;

when the electronic cigarette is discharged, the first working voltage is minus, and the second working voltage is plus; the microprocessor determines that the battery is in a discharging status, and calculates the actual discharging current according to the second working voltage; if the actual discharging current exceeds the preset discharging current threshold value, the fifth pin of the microprocessor sends the discharging controlling signal performing as a low level to the grid of the second MOSFET, and drives the second MOSFET to be turned off.

7. The over-current and over-voltage protection circuit for the electronic cigarette according to claim 6, wherein the discharging detection switch unit further includes a second resistor, and the second resistor is electrically connected between the grid of the second MOSFET and the source of the second MOSFET;

the second resistor is configured for supplying a bias voltage for the second MOSFET in a normal status.

8. The over-current and over-voltage protection circuit for the electronic cigarette according to claim 3, wherein the over-current and over-voltage protection circuit further comprises a Schottky diode and a filter capacitor;

an anode of the Schottky diode is electrically connected to the positive terminal of the interface, and a cathode of the Schottky diode is electrically connected to a first pin of the microprocessor; one end of the filter capacitor is electrically connected to the first pin of the microprocessor, and the other end of the filter capacitor is grounded;

the first pin of the microprocessor is configured for real-timely detecting the input voltage of the interface, and the Schottky diode is configured for supplying a stable supply voltage for the microprocessor in a normal operational status.

9. The over-current and over-voltage protection circuit for the electronic cigarette according to claim 4, wherein the over-current and over-voltage protection circuit further comprises a warning circuit;

the warning circuit configured for giving out a warning when the battery is in an over-current or over-voltage status is electrically connected between the battery and the control unit.

10. The over-current and over-voltage protection circuit for the electronic cigarette according to claim 9, wherein the warning circuit includes an LED, a cathode of the LED is electrically connected to a fourth pin of the microprocessor through a resistor, and an anode of the LED is electrically connected to the anode of the battery.

11. An over-current and over-voltage protection method for the electronic cigarette, wherein the over-current and over-voltage protection method comprises:

step 1: detecting a first working voltage generated by an actual charging current flowing through an internal resistor of a charging detection switch unit real-timely by the charging detection switch unit;

step 2: calculating the actual charging current according to the first working voltage, determining whether the actual charging current exceeds a preset charging current threshold value, and sending a first charging controlling signal to the charging detection switch unit by a control unit; meanwhile, detecting an input voltage of an interface real-timely, determining whether the input voltage of the interface is in over-voltage status, and sending a second charging controlling signal to the charging detection switch unit by the control unit; and step 3: controlling a turned-on or turned-off operation of the charging detection switch unit by the first charging controlling signal or the second charging controlling signal.

12. The over-current and over-voltage protection method for the electronic cigarette according to claim 11, wherein the step 1 further includes:

detecting a second working voltage generated by an actual discharging current flowing through an internal resistor of a discharging detection switch unit real-timely by the discharging detection switch unit;

and the step 1 further includes determining processes as follows:

if the first working voltage is plus, and the second working voltage is minus, determining that a battery is in charging status, and continuing the step 2; if the first working voltage is minus, and the second working voltage is plus, receiving the second working voltage by the control unit, determining that the battery is in discharging status by the control unit, and entering step 2';

step 2': calculating the actual discharging current according to the second working voltage, determining whether the actual discharging current exceeds a preset discharging current threshold value, and sending a discharging controlling signal to the discharging detection switch unit by the control unit;

step 3': controlling a turned-on or turned-off operation of the discharging detection switch unit by the discharging controlling signal.

\* \* \* \* \*